United States Patent [19]
Hayes

[11] 3,724,841
[45] Apr. 3, 1973

[54] SHEET DISCHARGE MECHANISM
[75] Inventor: Leonard L. Hayes, Lewiston, Idaho
[73] Assignee: Potlatch Forests, Inc., San Francisco, Calif.
[22] Filed: Dec. 27, 1971
[21] Appl. No.: 212,112

[52] U.S. Cl. .................................271/68, 214/6 DK
[51] Int. Cl. ...........................................B65h 29/70
[58] Field of Search...271/68, 69, 71, 76, 86, DIG. 9; 214/6 DK

[56] References Cited

UNITED STATES PATENTS

| 3,154,307 | 10/1964 | Williamson | 271/71 |
| 3,589,165 | 6/1971 | Lamberson et al. | 271/68 X |
| 3,622,150 | 11/1971 | Hayes | 271/68 |
| 3,651,961 | 3/1972 | Hayes | 271/68 |

Primary Examiner—Harvey C. Hornsby
Assistant Examiner—Bruce H. Stoner, Jr.
Attorney—Wells, St. John & Roberts

[57] ABSTRACT

A conveyor discharge mechanism and method for receiving, controlling the motion of, and stacking self-supported sheets of resilient sheet material, particularly veneer. Plural discharge mechanisms are disposed successively at respective stacking stations along a longitudinal, continuously operating initial sheet material conveyor. The initial conveyor moves the sheets in an upward, self-supporting arched configuration. Each discharge mechanism is utilized to receive sheets of specific width. Each mechanism includes guides to maintain the arched configuration of each arched sheet as it falls from a release station. The guides direct the side edges of the sheet to edge engaging surfaces of the mechanism. The initial velocity of the sheet is reversed by the surfaces to move the sheet back to a stop. A discharge means is then activated to again release the sheet along guides to a flat vertical stack below.

7 Claims, 8 Drawing Figures

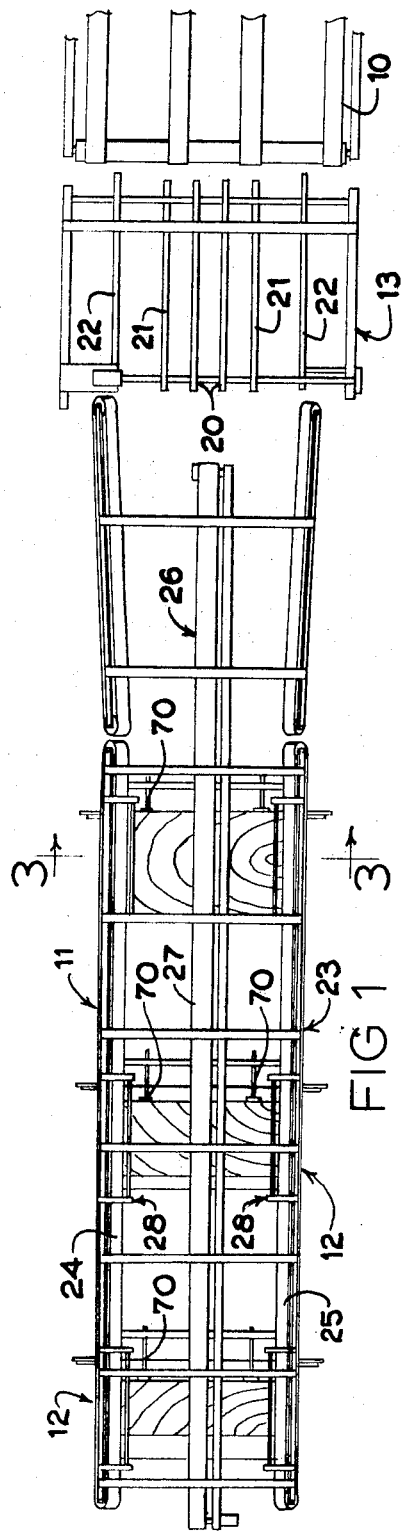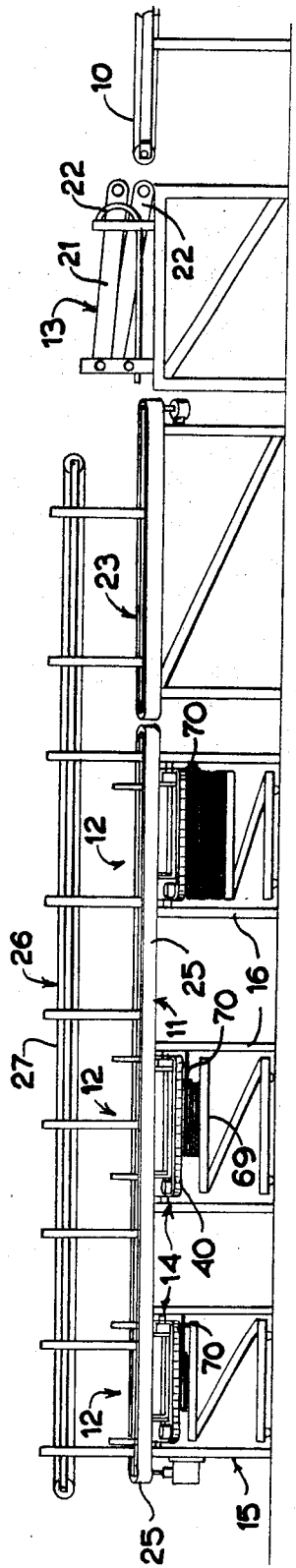

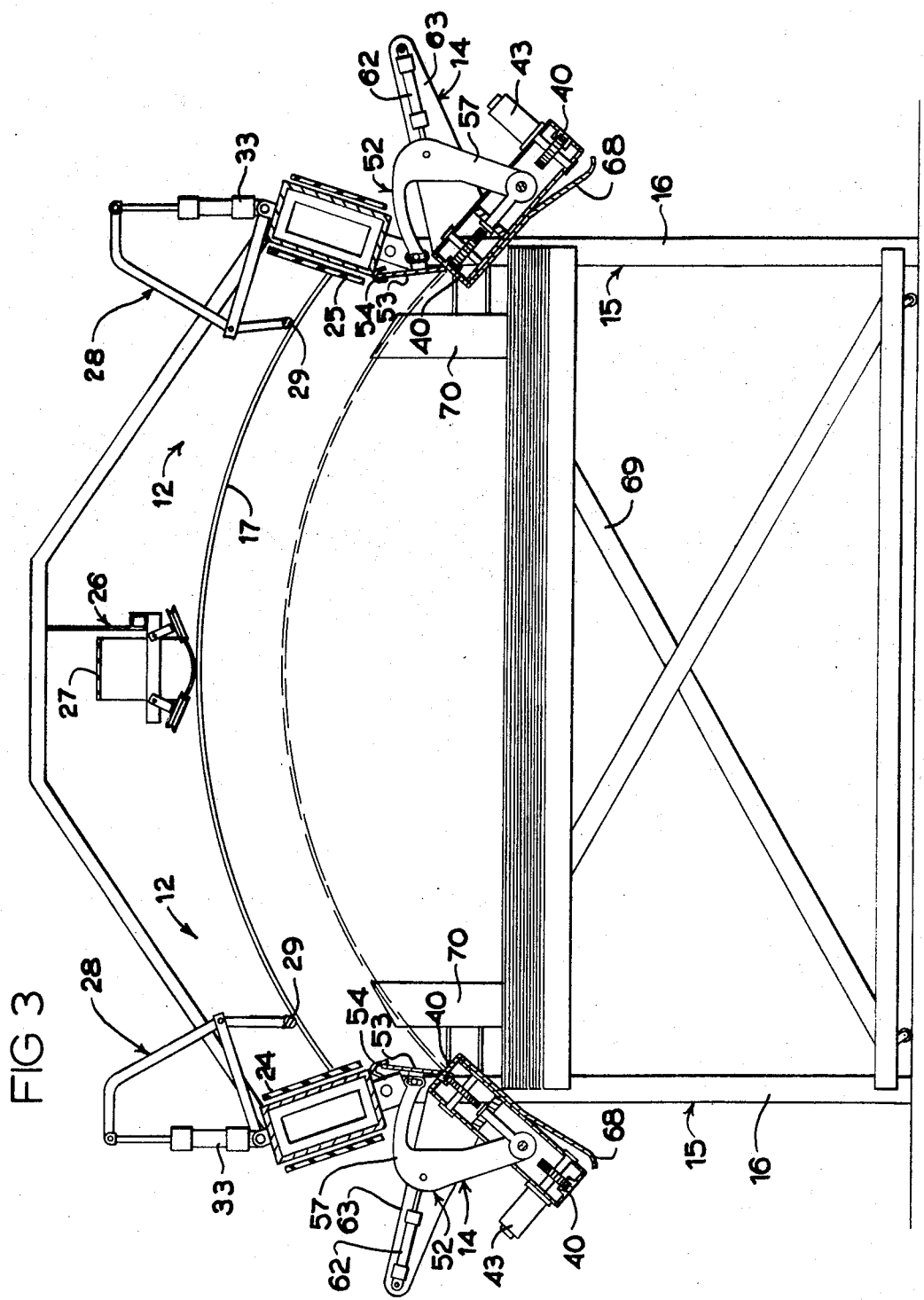

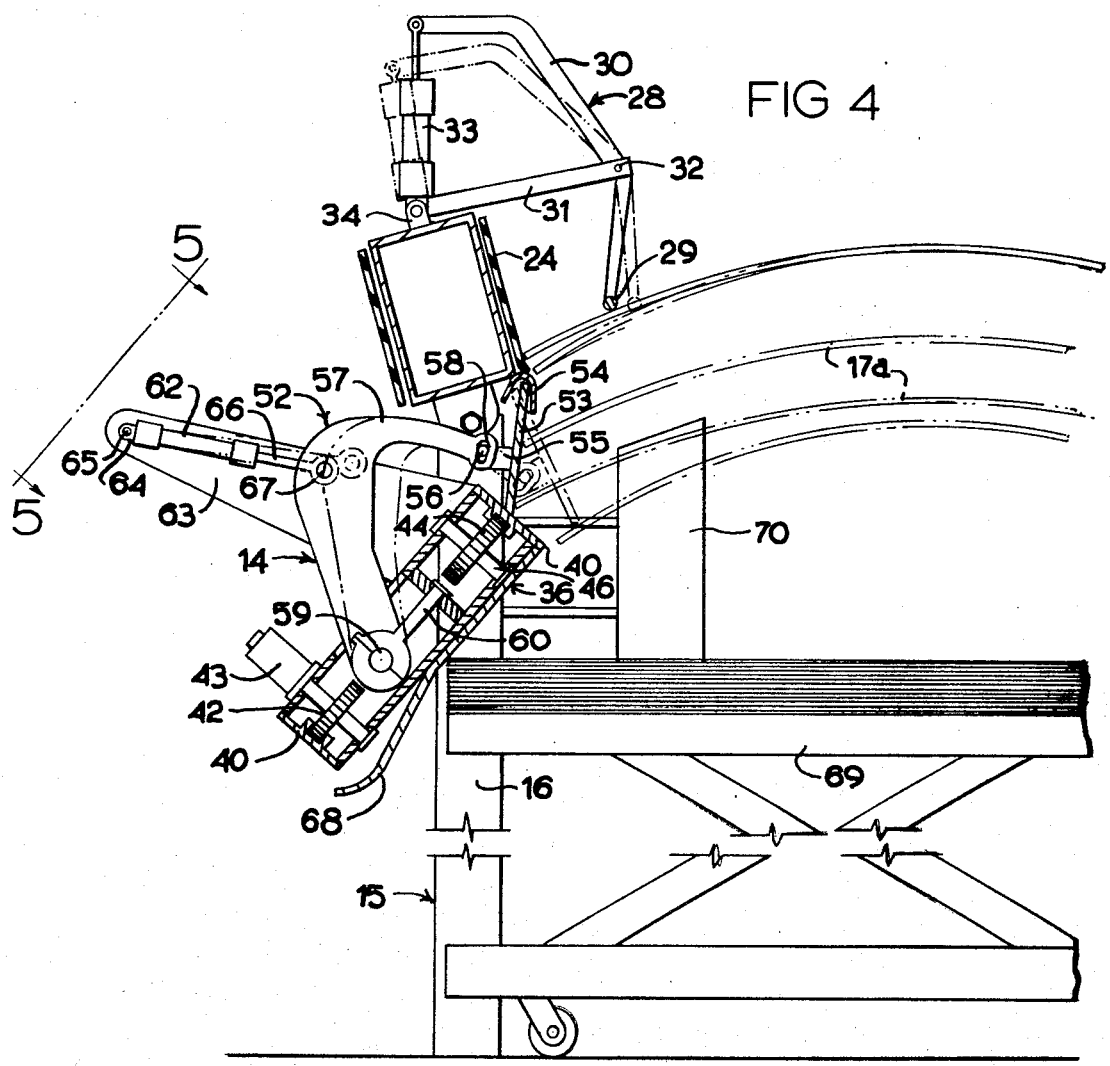

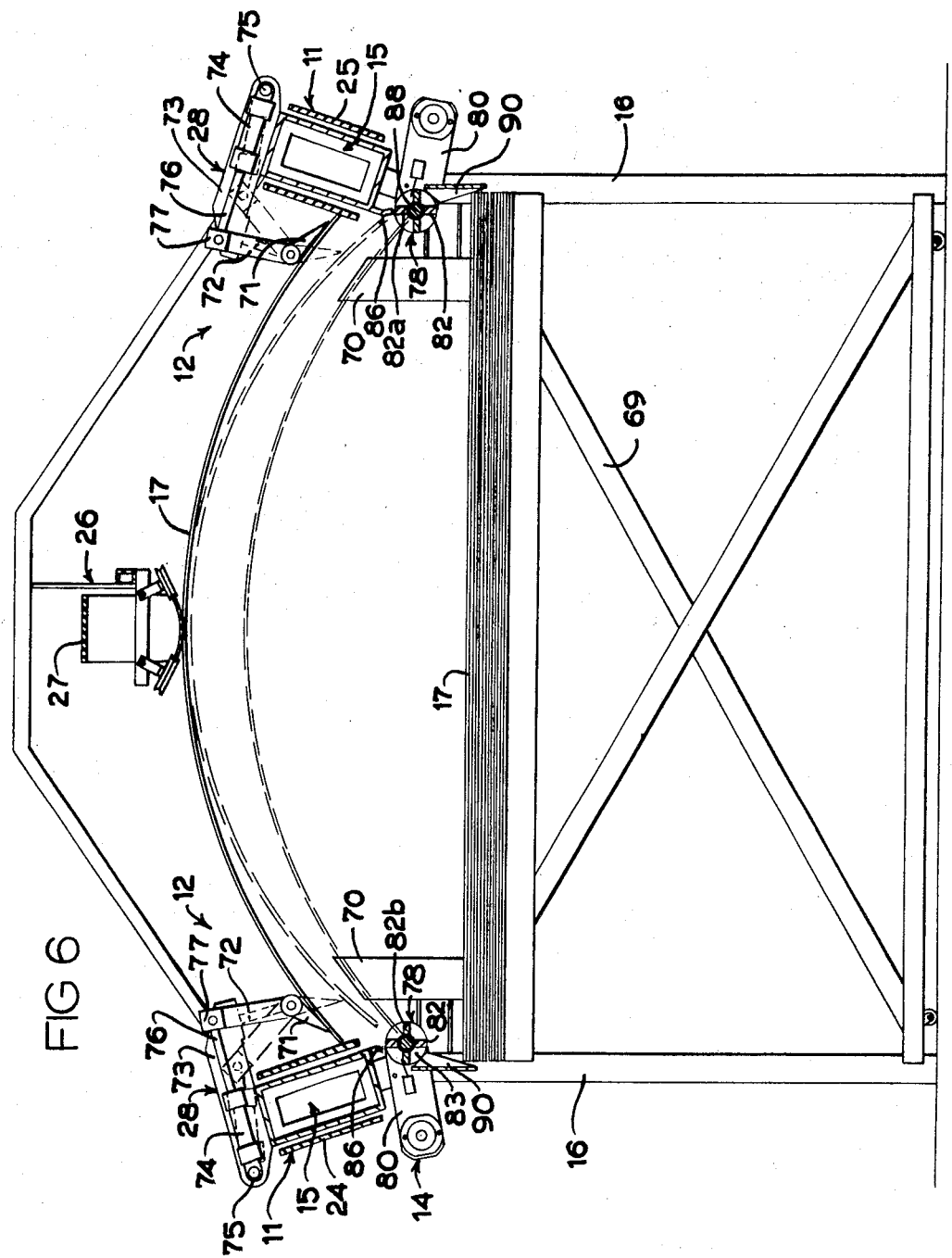

SHEET DISCHARGE MECHANISM

BACKGROUND OF THE INVENTION

The present invention was designed particularly for use on sheet conveying and releasing devices (used in plywood and veneer manufacturing processes) which convey sheets in an upwardly arched configuration to stacking stations.

In the plywood industry, veneer is peeled from a log and directed along multiple conveyors to a clipper. The clipper is used to trim each sheet to the maximum usable width permitted by the nature of the wood veneer. All veneer sheets are produced with substantially the same length, the length of each sheet being transverse to the conveying devices. The sheets of wood veneer in their initial "green" state must then be stacked for later use, generally being arranged according to width and quality.

The operation of the apparatus disclosed is accomplished by an initial conveyor including a pair of endless belts having upright flights that face one another. A feed mechanism at the infeed ends of the belts arches each sheet upwardly in a transverse orientation (parallel to the wood grain in the case of wood veneer sheets) and directs each sheet to the belts, where the side edges of the sheets are frictionally engaged by the belt surfaces. Longitudinal guides are provided inward of the belts to assist in maintaining the sheets in proper position as they move along the length of the conveyor. One or more stacking assemblies are located along the belts, each having a receiving means below. Release means are provided above each stacking assembly for engaging each sheet of a specific width and releasing it from contact with the moving belts.

A great deal of difficulty has been experienced in the release and stacking of the veneer sheets along continuously operating initial sheet conveying devices as described above. This difficulty arises from two sources. First, the velocity of the sheets, after being released from the moving belts of the initial conveyor, renders them extremely susceptible to breakage if the conveyor is to move the sheets at a velocity sufficient to justify its use. Secondly, the sheets, when allowed to fall freely onto stacks, tend to drift to one side or another in the manner of a falling leaf, thereby forming an uneven stack which is difficult to handle for further processing.

The above problems are eliminated according to the present disclosure by conveyor discharge mechanisms located beneath the release stations of the initial conveyor. Guide plates of a discharge conveyor maintain the arched configuration of each sheet while guiding it down to the opposed edge-engaging surfaces of a secondary conveyor below. The motion of the sheet is reversed by the moving sheet-engaging surfaces and the sheet is moved back to a stop. It is held against the stop by the conveyor as the edge-engaging surfaces move along the supporting side edges. The side edges are then disengaged and the sheet is allowed to fall along upright guides to a neat, vertical stack below.

SUMMARY OF THE INVENTION

The present invention basically comprises a combination of a first conveying and releasing means and a secondary conveying and discharge means for handling resilient sheet material having parallel side edges. The first conveying and releasing means is basically comprised of an opposed pair of longitudinal endless belts or other conveying devices having upright working flights facing toward one another and spaced apart horizontally by a distance less than the width of a sheet. A feed means, located at the infeed end of the first conveying and release means, bends each sheet into an upward arched configuration before its side edges are fed between and engaged by the working surfaces of the endless belts. The endless belts carry the sheets in this self-supporting arched configuration to a series of release stations where the sheets are released, according to width, and directed to secondary conveying and discharge means.

The secondary conveying and discharge means comprise an opposed pair of guides for engaging the side edges of each sheet and maintaining the self-supporting arched configuration of each sheet as it is released between the flights of the first conveying means. The secondary conveying means moves each sheet, in a longitudinal direction opposite that of the first conveyor, to a stop where a discharge means releases the sheet by moving the supporting side edges off the engaging surfaces of the secondary conveyor, thereby allowing the sheet to drop along guides to a vertical stack below.

The first object of my invention is to provide means for accepting and neatly stacking resilient sheet material under each station of a series located along a continuously operating initial conveying and release means.

A further object of my invention is to provide such an accepting and stacking means that minimizes damage to the sheet material.

Another object of my invention is to provide a means to maintain each sheet in a self-supporting arched configuration throughout the operation of my invention to insure accurate control of normally flexible sheets.

A further object of my invention is to provide such a sheet accepting and stacking means that will not interfere with normal continuous operation of the initial conveying and releasing means.

Another object of my invention is to provide such a means that will allow the initial conveying and releasing means to maintain greater operating speeds without intermittent stoppage for stacking purposes.

These and further objects will be evident from the following disclosure, taken along with the accompanying drawings, which illustrate two preferred forms of the invention.

DESCRIPTION OF THE DRAWINGS

FIG. 1 is a plan view of a sheet conveying and releasing apparatus;

FIG. 2 is a side view of the object of FIG. 1 showing the conveying and releasing apparatus in conjunction with several sheet discharge mechanisms;

FIG. 3 is an enlarged frontal sectional view taken along line 3—3 in FIG. 1, illustrating a first preferred embodiment of my invention;

FIG. 4 is a partial sectional view illustrating one side of the apparatus of FIG. 3 in greater detail;

FIG. 5 is an auxiliary side view of the object of FIG. 3 taken along line 5—5;

FIG. 6 is a front sectional view of a second preferred embodiment of my invention;

DESCRIPTION OF THE PREFERRED AND ALTERNATE EMBODIMENTS

Figure 7:
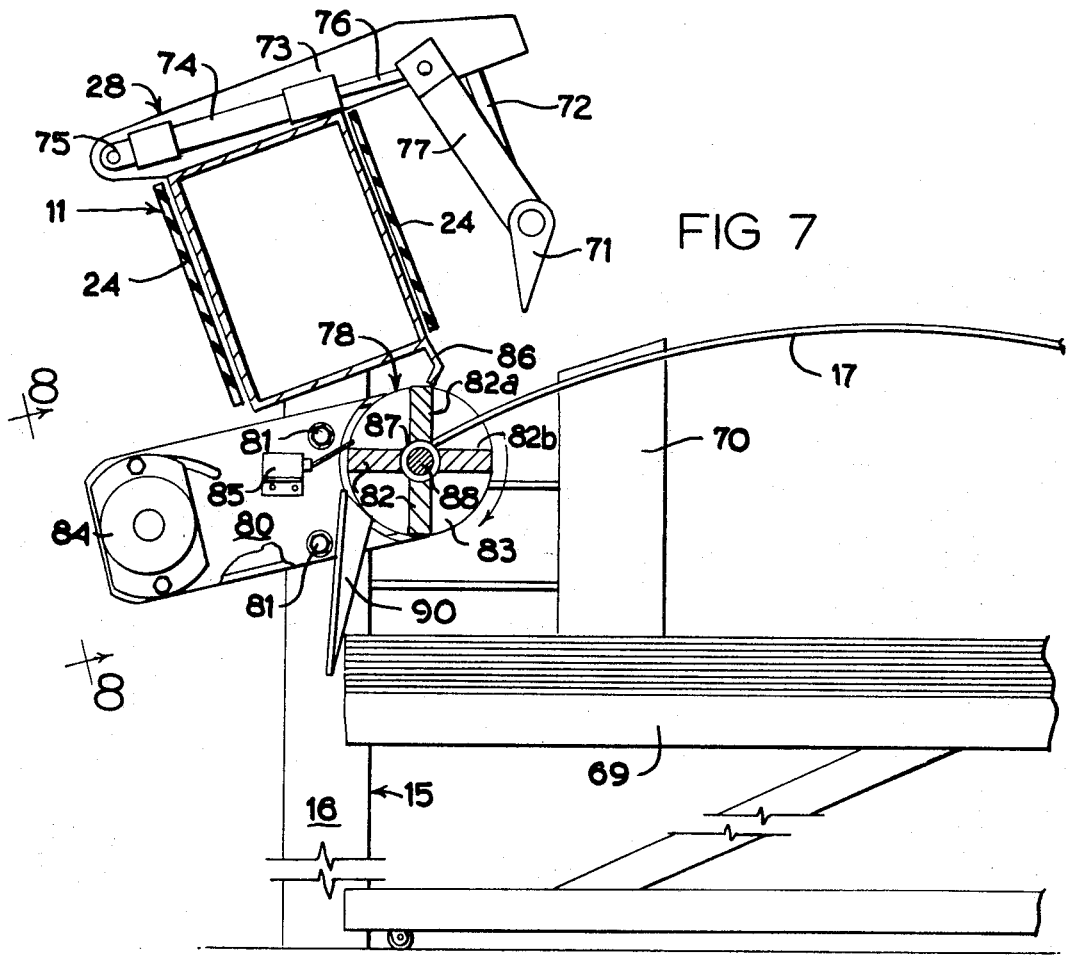
FIG. 7 is a partial sectional view illustrating one side of the apparatus of FIG. 6 in greater detail.

Reference shall be made herein to the handling of "sheets" of relatively thin resilient material, such as wood veneer, having a normally flat configuration and capable of being formed into a self-supporting curved arch without permanent deformation or "set".

The length of each sheet of veneer for plywood production is typically slightly more than eight feet. Each sheet is arched along this length in a transverse direction relative to the conveyor assemblies along which it travels. The veneer sheets are clipped to widths of 54 inches, 27 inches, and miscellaneous random widths necessitated by veneer peculiarities.

Each sheet has a pair of "side edges" substantially parallel to one another. The term "side edges" relates to the positions of these referenced edges along the sides of the longitudinal conveyor. In the specific instance of veneer sheets, the "side edges" of each sheet along the conveyor are located across the longer ends of the sheet and are perpendicular to the wood grain.

Each apparatus described below is designed specifically for veneer production, but can be readily envisioned as a conveying, discharging and stacking device for other sheet materials having a constant length across the conveyor. So, while the description will refer to "veneers" it is to be borne in mind that sheets handled by the apparatus can be of other than wood materials.

The operation of the present invention involves the method steps of: transversely arching each sheet without permanent deformation of the sheet material; conveying the arched sheet in a first longitudinal direction; releasing the sheet; maintaining the arched configuration of the sheet during such release; conveying the sheet in a second direction of travel opposite that of the initial movement of the sheet to a stop; and again releasing the sheet.

The step of arching the sheet is accomplished by engaging opposite sheet areal surfaces and bending it into a self-supporting arch without causing deformation of the material. This can be accomplished during longitudinal travel of the sheet by progressively raising the longitudinal center of the sheet while maintaining the sheet edges at a constant elevation.

The conveying step requires that inwardly directed forces be applied to the respective side edges of the sheet so as to maintain the arched configuration of the sheet during travel. In the example shown, the side edges themselves are engaged for this purpose and are maintained in horizontal planes while spanned by an upwardly extending arch. This leaves the entire area below the sheet free of support.

The releasing step involves the application of forces to the area adjacent the side edges of the sheet to disengage the motion-imparting forces thereby allowing the sheet to fall. The arched configuration is maintained during the fall of the sheet by inwardly directed forces slidably directed to the respective side edges of the sheet.

The conveying of the sheet in a second direction of travel opposite that of the first direction is accomplished by applying frictional, motion-imparting forces to the side edges in a horizontal direction opposite the first direction. After moving to a pre-selected longitudinal location, the sheet is stopped by forces directed against the rear edge of the sheet.

The releasing step is accomplished by applying inward forces adjacent the respective side edges of the sheet to disengage the inward and motion-imparting forces thereby allowing the sheet to fall vertically onto a stack below.

As seen in FIGS. 1 and 2, a sheet conveying and releasing means is utilized at the exit end of a supply conveyor 10. An initial sheet conveyor assembly is shown generally at 11, leading past a series of sheet stacking stations shown at 12. The sheet material is moved longitudinally (from right to left) with respect to FIGS. 1 and 2 along conveying assembly 11 in a self-supporting transversely-arched configuration. The sheets are then vertically stacked according to width at successive stacking stations 12.

A feed mechanism 13, located between the supply conveyor 10 and initial sheet conveyor 11, initiates a transition from the flat position of the sheets on supply conveyor 10 to a transversely self-supporting arched condition. Feed mechanism 13 is comprised of a central pair of conveyors 20 and an outer pair of conveyors 21 which cooperate with edge guide extensions 22 to properly shape each sheet entering the initial sheet conveyor assembly 11.

Initial sheet conveyor assembly 11 includes a substantially horizontal conveyor 23 supported by a framework 15, for moving the arched veneer sheets to stacking stations 12. Conveyor 23 includes two powered opposing parallel belts 24 and 25 that are mounted at an inclined upright position for engaging the supporting side edges of the sheets. The belts are spaced apart a distance less than the length of the sheets in order that the self-supporting upward arch may be maintained throughout the distance to stacking stations 12. Uniformity of the upward arch of the sheets is maintained by a hold-down conveyor 26.

Hold-down conveyor 26 is centrally located between belts 24 and 25 of initial sheet conveyor 11 and runs longitudinally from the exit end of feed conveyor 13 to the end of sheet conveyor 11. Conveyor 26 includes a powered endless belt 27 for engaging the uppermost surface of each arched sheet to maintain a uniform arched configuration throughout the travel of the sheets from their exit from feed mechanism 13 to the respective stacking stations 12.

When used for veneer stacking and sorting purposes, the several sheet stacking stations 12 are preferably utilized to each receive veneer of a different width.

Three stacking stations 12, shown in FIGS. 1 and 2, are located successively along initial sheet conveyor 11. Each stacking station 12 utilizes a pair of opposed sheet releasing mechanisms 28. Each sheet releasing mechanism 28, located at the sides of framework 15, has a longitudinal pusher rod 29 that selectively urges the side edges of a sheet inwardly. Rod 29 is fixed to a pair of support arms 30 which are pivotally connected to inwardly extending brackets 31. Support arms 30 are pivoted on brackets 31 about a longitudinal axis along pivotal connections 32. Rod 29 is controlled in position by means of a selectively operable cylinder 33 connected between conveyor frame 15 and a rigid extension of one support arm 30 at a pivotal connection 34. Cylinder 33 may be operated, simultaneously with its mate on the opposite side of framework 15, to move support arms 30 and rod 29 from the normal position shown in solid lines (FIG. 4) to a releasing position shown in dashed lines. The resulting change in attitude of a sheet 17a as its edges are moved inwardly and freed from belts 24 and 25 is also shown in dashed lines in FIG. 3. Released sheet 17a is free to fall between the space separating belts 24 and 25.

As seen in FIGS. 1, 2 and 3, discharge mechanisms 14, of a first preferred embodiment, are located under each successive release station 12. FIGS. 4 and 5 illustrate one side of the elongated discharge mechanism 14, supported by a frame 36. Upright members 16 of framework 15 support frame 36 by bolts 37 (FIG. 5) threadably engaged in members 16 through mounting brackets 38. Mounting brackets 38 rigidly support an elongated bar 39 which acts as a backing member to support the upper flight of an endless conveyor belt 40.

Endless belt 40 consists of a plurality of linked rectangular pallets 41. Pallets 41 are constructed of plastic or other material capable of maintaining a relatively low coefficient of friction at the sheet engaging surface. Such belts are common to the conveying arts.

Endless belt 40 is continually driven in a direction opposite to the movement imparted to belts 24 and 25 of sheet conveyor 11. It is powered by a driving gear 42 rotatably journalled on frame 36 and connected to a driving motor 43. Belt 40 travels about a course defined by idler gears 44, a tension adjusting gear 45 and driving gear 42. Idler gears 44 are rotatably mounted to the upper portion of frame 36 by pins 46. Idler gears 44 are longitudinally spaced to form the upper elongated sheet engaging flight of belt 40. The lower return flight is formed by driving gear 42 and adjusting gear 45. Tension adjusting gear 45 is rotatably mounted by a shaft 47 to one end of a pivotal arm 48. The other end of arm 48 pivots about bolt 50 which threadably communicates with a rigid projecting ear 51 of framework 36. By loosening bolt 50, the arm 48 may be pivoted to extend the adjusting gear downwardly or upwardly in an arc, thereby tightening or relaxing the longitudinal tension on belt 40.

Each sheet, as it falls between belts 24, 25 due to engagement by a release mechanism 28, is guided to the belts 40 and is subsequently discharged therefrom by a discharge assembly 52 at each side of the assembly. Each discharge assembly 52 is basically comprised of an elongated rectangular pusher plate 53 having an upper longitudinal edge pivotably journalled in a U-shaped guide channel 54 to allow arcuate movement of the lower edge as initiated by a bellcrank 57 and air cylinder 62.

Pusher plate 53, in its normal position also acts as a guide engaged by the sheet side edges so as to maintain each sheet 17 in an upwardly arched configuration while it falls to belts 40 of discharge mechanism 14. The back side of plate 53 includes integral outwardly projecting ears 55, each having a pin 56, which extends through a slot 58 in bellcrank 57. The bellcranks 57 are substantially C-shaped, with slots 58 in the upper end portions and are fixed to elongated axles 59 at the lower end portions. A spaced pair of connecting rods 60 fixed to framework 36 rotatably journal each axle 59.

The pivotal motion of the bellcranks 57 and axle 59 is controlled by a double-acting air cylinder 62. A bracket 63 extends from framework 36 to provide pivotal support for the outer end 64 of cylinder 62. A bolt 65 extends through end 64 and is threadably fixed to bracket 63. A piston arm 66 of cylinder 62 is pivotably connected to bellcrank 57 at a position between slot 58 and axle 59 by a pin 67.

As air cylinder 62 is activated, piston arm 66 is either forced into or away from the cylinder, thereby pivoting bellcrank 57 and axle 59. The upper end portion of each bellcrank 57 then causes the lower edge of pusher plate 53 to swing inward or outwardly in an arcuate path. The extended and normal positions of plate 53 are shown, in dashed lines and solid lines respectively, in FIG. 4.

The inward surfaces of each discharge frame 36 support a guide plate 68 which allows each sheet 17 to gradually regain its normally flat configuration as it falls from the discharge mechanism 14 to a stacking table shown generally at 69. The stacking tables 69 are preferably of the type that adjust vertically to accommodate the increasing height of a stack of veneers.

Vertical stop plates 70 are mounted inward from belts 40 to stop each sheet while engaged by belts 40, by engaging the rear sheet edge. Stop plates 70 are adjustably fixed to frame 15, enabling the apparatus to be pre-set to center sheets of a given width above the stacking tables.

Veneer sheets, taken from a supply conveyor 10, are bent into an upward, self-supporting transversely-arched configuration, by infeed conveyor 13, then carried by sheet conveying and releasing assembly 11 to successive stacking stations 12 where each sheet is released according to size.

Pusher plates 53, of discharge mechanisms 14, allow each sheet to fall to belts 40 while maintaining its arched configuration. The continuously moving belts 40 slide rearwardly under the side edges of the sheet until the initial forward velocity, initiated by the sheet conveyor 11, is stopped. The sheet is then carried rearwardly by belts 40 until the rear edge of the sheet contacts stops 70. Belts 40 then hold the sheet against stops 70 by sliding under the side edges. Air cylinders 62 are next activated to operate pusher plates 53, which force the side edges of the sheet inwardly off the engaging surfaces of belts 40. Guide plates 68 then allow the sheet to regain its original flat configuration while guiding its fall to the uniform vertical stack on a stacking table 69 below. Vertical corrugations or guides (not shown) along one end of each plate 68 help to insure controlled vertical movement of the sheets. The complete stacks of sheets may then be removed for further processing.

Figure 8:
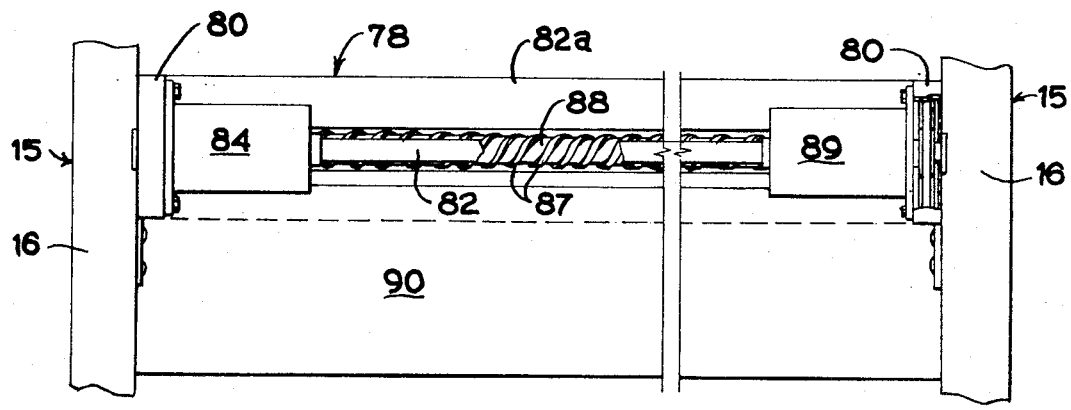
FIG. 8 is an auxiliary side view of the apparatus of FIG. 7 taken along line 8—8 in FIG. 7.

A second preferred embodiment of my invention is illustrated by FIGS. 6, 7 and 8 of the drawings.

As seen in FIGS. 6 and 7, an alternate type of sheet releasing mechanism 28 is utilized to release successive sheets to discharge mechanisms 14. Each mechanism includes opposed, elongated flippers 71 pivotally connected by rods 72 to frame plates 73. Plates 73 are affixed to framework 15 of initial conveyor 11. Double-acting pneumatic cylinders 74 are attached to plates 73 at their outside ends 75. The slidable piston shafts 76 of cylinders 74 are connected to extending arms 77 of flippers 71. Cylinders 74 are operated simultaneously to move flippers 71 to the position shown in FIG. 6 by dashed lines. The resulting configuration of a sheet as engaged by flippers 71 is also shown by dashed lines.

The sheet falls, after operation of release mechanisms 28, to discharge mechanisms 14 of the second preferred embodiment. Each discharge mechanism 14 of this embodiment comprises opposed powered drums 78 with coaxial, but independently powered screws 88.

The discharge mechanisms 14 of this embodiment are mounted to upright members 16 of framework 15 by spaced brackets 80. Bolts 81 extend through each bracket 80 to threadably engage uprights 16.

Elongated drums 78 include vanes 82 extending between radial end supports 83. The four vanes of each drum 78 are equiangularly spaced to form 90° segments. Motors 84 rotate each drum 78 simultaneously in 90° segments, as determined by limit switches 85. A single activation of motors 84 oppositely rotate the upper vanes 82a to the inwardly projecting positions formerly occupied by the vanes shown at 82b.

Guide plates 86 extend angularly downward from belts 24 and 25 to provide a slidable relationship with the side edges of each released sheet. The plates 86 are spaced apart a distance slightly less than the length of the sheets in order to maintain their upwardly arched condition as they fall. As the sheet leaves plates 86, the side edges are then engaged by the inwardly facing surfaces of the upper vanes 82a which serve as extensions of plates 86. The sheet is guided by vanes 82a to the edge engaging threads 87 of opposed elongated screws 88.

Opposite ends of screws 88 are rotatably mounted in brackets 80 coaxially with drums 78. The inside longitudinal edges of the converging vanes 82 are concave to conform closely to the periphery of screws 88 without actual contact. Each screw 88 has portions of its periphery exposed between adjacent converging vanes 82 to enable threads 87 to engage the side edges of the sheet (FIG. 7). Motors 89 are operatively connected to constantly rotate screws 88 in unison. Threads 87 are so arranged on screws 88 for imparting longitudinal motion to each sheet in a direction opposite that imparted by initial conveyor 11. The edge engaging surfaces of the threads 87 are designed to engage the side edges without damage to the sheet.

The forward velocity of the sheet, imparted by initial conveyor 11, is slowed and the sheet is eventually moved rearwardly by contact with continually revolving screws 88. Rearward movement of the sheet is subsequently halted by stops 70 as they engage the rearward sheet edge. Screw threads 87 then turn beneath the side edges to hold the sheet against stops 70.

After contacting stops 70, the sheet is discharged by the operation of drum 78. Vanes 82 rotate inwardly and downwardly to engage the upper surface of the sheet adjacent the side edges to force the sheet inward and downwardly over the periphery of the revolving screws. As the inward surfaces of vanes 82a reach the position formerly occupied by the downward facing surfaces of vanes 82b, the sheet is allowed to fall to stacking tables 69. The sheet edges slide downwardly along the vertical inside facing surfaces of lower vanes 82, then fall to the stacking table 69 guided by edge guide plates 90. Guide plates 90 are downwardly angled to allow the sheets to gradually regain their formerly flat configuration and to create an even vertical stack of sheets on table 69.

Having thus described my invention, I claim:

1. An apparatus for longitudinally conveying and vertically stacking a plurality of normally flat sheets of resilient material having a common width, comprising:

first longitudinally moving conveyor means having opposed sheet engaging surfaces facing toward one another, said surfaces being spaced apart horizontally by a distance slightly less than the sheet width;

feed means for placing the sheets in succession between the surfaces of said conveying means with the sheets being transversely arched in an upward direction and the side edges of each sheet respectively engaged by the surfaces and aligned parallel to the direction of movement thereof;

sheet release means located at a pre-selected station along the conveyor means, including force-applying elements mounted along said conveyor means for urging the side edges of a sheet inwardly of the respective sheet engaging surfaces, thereby freeing the sheet and permitting it to drop vertically between the surfaces;

and conveyor discharge means located at said pre-selected station, at an elevation below the conveyor means, for receiving each sheet freed from said conveyor means by said sheet release means, said conveyor discharge means comprising:

a secondary sheet edge engaging conveyor located respectively beneath the surfaces of said first conveyor means for maintaining a transverse arch across each sheet deposited thereon by said sheet release means and vertically supporting the sheet at an intermediate elevation clear of sheet supported by said conveying means, while imparting longitudinal movement movement to said sheet;

stop means in the path of each sheet supported by said secondary conveyor for arresting longitudinal movement thereof when engaged by the sheet;

and force applying means mounted along said secondary conveyor means for selectively moving the side edges of a sheet inwardly of said secondary conveyor while the sheet remains in engagement with said stop means, thereby permitting the sheet to fall vertically for stacking purposes.

2. The apparatus as set out in claim 1 wherein said secondary conveyor comprises:

a pair of upwardly-facing endless conveyor flights;

power means operatively connected to said endless conveyor flights for moving said flights in a longitudinal direction opposite to that of the sheet engaging surfaces of said first conveying means;

said force applying means comprising:

pusher plates extending upwardly from each conveyor flight along the outer longitudinal areas thereof;

and means operatively connected to said pusher plates for selectively moving the pusher plates inwardly across said conveyor flights, whereby the side edges of a sheet engaged during such movement are moved inwardly of said conveyor flights.

3. The apparatus as set out in claim 1 wherein said secondary conveyor and said force applying means comprise:
  a pair of longitudinal drums mounted respectively along the sides of the pre-selected station, each drum comprising a plurality of radial vanes and a central longitudinal screw having an outer threaded surface exposed along the intersection of said vanes, said drum and screw being coaxially and independently mounted for rotation about a longitudinal axis;
  first power means operatively connected to said drum for angularly positioning the vanes thereof relative to the longitudinal axis;
  and second power means operatively connected to said screw about said longitudinal axis.

4. In an apparatus for handling sheets of resilient material having a normal plane configuration and including parallel side edges;
  a first longitudinal conveyor having a pair of endless belts including longitudinally moving upright working flights facing toward one another for carrying the sheets in a forward direction, said working flights being spaced apart horizontally by a distance less then the width of a sheet;
  feed means for transversely arching each sheet as it is placed in succession between the belts with the respective side edges of the sheet in surface engagement with the working flights of the belts;
  first sheet releasing means engageable with a sheet adjacent at least one side edge thereof for selectively moving said one side edge inwardly from and out of engagement with the conveyor flight engaged thereby;
  and conveyor discharge means for receiving each sheet as it falls vertically between said longitudinal conveyor flights after engagement by said sheet releasing means, said conveyor discharge means comprising:
  a second longitudinal conveyor including a pair of longitudinally moving working surfaces and guides associated therewith for engaging the sheet side edges and maintaining each sheet in a transversely arched configuration while imparting longitudinal motion to the sheet in a rearward direction opposite to that imparted thereto by said first longitudinal conveyor;
  an upright surface in the path of each sheet on said second longitudinal conveyor for locating the sheet longitudinally by engagement of the rear sheet edge and for arresting further longitudinal motion of the sheet following such engagement;
  and second sheet releasing means engageable with a sheet adjacent at least one side edge thereof for selectively moving said side edge inwardly of the working flight and guides of said second longitudinal conveyor, thereby permitting the sheet to fall vertically between the second longitudinal conveyor with its leading sheet edge located longitudinally.

5. An apparatus as set out in claim 4 wherein said second longitudinal conveyor comprises:
  a pair of longitudinally oriented screws mounted parallel to one another and including inward surfaces spaced apart by a distance less than the normal plane distance between the sheet edges;
  first power means operatively connected to said screws for rotating them in unison;
  said second sheet releasing means comprising:
  a pair of elongated rotatable drums mounted coaxially with the respective screws for independent rotation relative to the screws, each drum including a plurality of radial longitudinal vanes which converge toward the screw;
  and second power means operatively connected to said drums to selectively rotate them in unison in opposite directions to thereby force the side edges of a sheet inwardly off the inward screw surfaces.

6. An apparatus as set out in claim 4 wherein said second longitudinal conveyor comprises:
  a pair of longitudinally oriented screws mounted parallel to one another about axes located beneath the working flights of said first longitudinal conveyor, said screws including inwardly-facing surfaces spaced apart by a distance less than the normal plane distance between the sheet edges;
  first power means operatively connected to said screws for constantly rotating them in unison;
  said second sheet releasing means comprising:
  a pair of elongated rotatable drums mounted coaxially with the respective screws for independent rotation relative to the screws, each drum comprising radial end supports spaced longitudinally along the screw axis by a distance greater than the length of the sheet side edges and having a plurality of equiangularly spaced longitudinal vanes mounted between the supports and projecting outwardly from the respective screws, a portion of the screw being exposed between each adjacent pair of vanes;
  and second power means operatively connected to said drums to selectively rotate them in unison in opposite directions between successive angular positions about said axes at which one vane of each drum extends outwardly therefrom with its inward surface projecting toward the working flight of the first longitudinal conveyor above it as a substantial extension thereof.

7. A method of handling resilient sheets of material capable of being self-supporting in a transversely arched configuration, comprising the following steps:
  transversely arching each sheet without permanent deformation of the sheet material;
  conveying the sheet in a first longitudinal direction of travel to a pre-selected stacking station while maintaining such arched configuration by application of inwardly directed forces to the sheet adjacent to its respective side edges;
  releasing the sheet by applying thereto forces directed inwardly at locations adjacent the respective side edges of the sheet;
  maintaining the arched configuration of the sheet during such release;
  subsequently conveying the sheet in a direction of travel opposite to said first longitudinal direction until bringing the sheet to a pre-selected longitudinal location;

and again releasing the sheet by applying thereto forces directed inwardly at locations adjacent the respective side edges of the sheet while maintaining the pre-selected longitudinal location of the sheet.

* * * * *